(12) United States Patent
Burgess (10) Patent No.: US 11,520,916 B2
(45) Date of Patent: Dec. 6, 2022

(54) SYSTEM AND METHOD FOR AUTOMATED ON-SCREEN SENSITIVE DATA IDENTIFICATION AND OBFUSCATION

(71) Applicant: Verint Americas Inc., Alpharetta, GA (US)

(72) Inventor: Senan Burgess, Alpharetta, GA (US)

(73) Assignee: Verint Americas Inc., Alpharetta, GA (US)

( * ) Notice: Subject to any disclaimer, the term of this patent is extended or adjusted under 35 U.S.C. 154(b) by 320 days.

(21) Appl. No.: 16/560,455

(22) Filed: Sep. 4, 2019

(65) Prior Publication Data

US 2020/0159949 A1    May 21, 2020

Related U.S. Application Data

(60) Provisional application No. 62/768,251, filed on Nov. 16, 2018.

(51) Int. Cl.
| | |
|---|---|
| *G06F 17/00* | (2019.01) |
| *H04L 29/06* | (2006.01) |
| *G06F 21/62* | (2013.01) |
| *G06N 20/00* | (2019.01) |
| *G06F 21/31* | (2013.01) |
| *G06F 21/14* | (2013.01) |

(52) U.S. Cl.
CPC .......... *G06F 21/6218* (2013.01); *G06F 21/14* (2013.01); *G06F 21/31* (2013.01); *G06N 20/00* (2019.01)

(58) Field of Classification Search
CPC ...... G06F 21/6218; G06F 21/31; G06F 21/14; G06F 21/6245; G06F 21/84; G06N 20/00
See application file for complete search history.

(56) References Cited

U.S. PATENT DOCUMENTS

| | | | | |
|---|---|---|---|---|
| 8,341,104 | B2* | 12/2012 | Manickam | H04L 63/0407 |
| | | | | 706/47 |
| 9,148,285 | B2* | 9/2015 | Chang | H04L 63/0815 |
| 9,600,680 | B2* | 3/2017 | Rakshit | G06F 3/0488 |
| 10,043,033 | B1* | 8/2018 | Hadsall | G06K 9/00087 |
| 10,148,694 | B1* | 12/2018 | Sarin | H04L 63/14 |
| 10,824,769 | B2* | 11/2020 | Liu | G06F 21/6245 |
| 2007/0250920 | A1* | 10/2007 | Lindsay | G06F 21/31 |
| | | | | 726/7 |
| 2007/0276715 | A1* | 11/2007 | Beringer | G06Q 10/0633 |
| | | | | 705/7.27 |
| 2010/0125891 | A1* | 5/2010 | Baskaran | G06F 21/6218 |
| | | | | 726/4 |

(Continued)

*Primary Examiner* — Phy Anh T Vu
(74) *Attorney, Agent, or Firm* — Christopher M. Scherer; DeWitt LLP (57) ABSTRACT

The present invention permits automated on-screen identification and obfuscation of sensitive data. The protective system receives a user's attempt to access sensitive data in a session, determines the user's level of access to sensitive data, and then obscures any sensitive data for which the user must supply credentials by placing at least one data field block over the sensitive data before the sensitive data is displayed on a desktop. As such the sensitive data cannot be seen by the user. The system can receive at least one credential from the user and compare it to at least one protective analytics rule in order to determine if it should remove the block and allow the user to view the sensitive data.

19 Claims, 9 Drawing Sheets

(56) References Cited

U.S. PATENT DOCUMENTS

| | | | | |
|---|---|---|---|---|
| 2012/0198569 A1* | 8/2012 | Halas | G06F 21/316 | 726/30 |
| 2013/0036370 A1* | 2/2013 | Ananthakrishnan | H04L 63/10 | 715/753 |
| 2015/0113666 A1* | 4/2015 | Buck | G06F 21/50 | 726/28 |
| 2015/0200922 A1* | 7/2015 | Eschbach | H04L 63/08 | 358/1.14 |
| 2016/0379010 A1* | 12/2016 | Farkash | G06F 21/6245 | 726/1 |
| 2018/0027006 A1* | 1/2018 | Zimmermann | H04L 63/0245 | 726/11 |
| 2018/0096158 A1* | 4/2018 | Murphy | G06F 21/6218 | |
| 2019/0081965 A1* | 3/2019 | Oz | G06N 20/00 | |
| 2019/0236305 A1* | 8/2019 | Antonatos | G06F 21/10 | |

\* cited by examiner

SYSTEM AND METHOD FOR AUTOMATED ON-SCREEN SENSITIVE DATA IDENTIFICATION AND OBFUSCATION

CROSS-REFERENCE TO RELATED APPLICATIONS

This application claims the benefit of prior-filed, U.S. Provisional Patent Application No. 62/768,251, filed on Nov. 16, 2018, the contents of which are incorporated herein by reference in their entirety.

BACKGROUND

The present disclosure is directed to a method for computer analysis, specifically a method for identifying and obscuring sensitive data on-screen.

Customer service agents have access to large amounts of sensitive identity and financial data, which unscrupulous agents may access for purposes unrelated to their employment. Many systems lack the ability to selectively screen data unnecessary for an agent's job, allowing agents access to either all or none of a customer's data. Even if an agent is required to access sensitive information, they may access data for clients who have not requested assistance. Such open access can lead to difficulties with compliance with the data security standards (DSS) for the payment card industry (PCI), as well as poor customer and public relations.

There is an unmet need in the art for a system which can monitor and control agents' access to sensitive information using machine learning techniques.

SUMMARY

An example embodiment of the present application is a method for automated on-screen sensitive data identification and obfuscation. The method includes receiving a user's attempt to access sensitive data in a session, determining the user's level of access to sensitive data, and obscuring any sensitive data for which the user must supply at least one credential by placing at least one data field block over the sensitive data on a desktop before the sensitive data is displayed on the desktop. As such the sensitive data cannot be seen by the user. The method also includes receiving at least one credential from the user and comparing the at least one credential to at least one protective analytics rule.

Another example embodiment of the present application is a system for automated on-screen sensitive data identification and obfuscation. The system includes a processor and a non-transitory computer readable medium programmed with computer readable code that upon execution by the processor causes the processor to execute the above-mentioned method for automated on-screen sensitive data identification and obfuscation.

Another example embodiment of the present application is a non-transitory computer readable medium programmed with computer readable code that upon execution by a processor causes the processor to execute the above-mentioned method for automated on-screen sensitive data identification and obfuscation.

The objects and advantages will appear more fully from the following detailed description made in conjunction with the accompanying drawings.

DETAILED DESCRIPTION

In the present description, certain terms have been used for brevity, clearness and understanding. No unnecessary limitations are to be applied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims. Each limitation in the appended claims is intended to invoke interpretation under 35 U.S.C. § 112, sixth paragraph, only if the terms "means for" or "step for" are explicitly recited in the respective limitation.

A data obfuscation method 200 automatically identifies sensitive data 153 on a desktop 150 and obscures sensitive data 153 at the level of the desktop data field 151 using a data field block 152. The user is able to interact with the desktop 150 as normal, but in order to view the contents of an obscured desktop data field 151, they must enter additional credentials. Obscured sensitive data 153 can still be tagged to a screen recorder 160, i.e. the same role-based decryption could apply on playback and quality monitoring. The data obfuscation method 200 could also be applied separately to playbacks from a screen recorder 160 where the agent is not authorized to view sensitive data 153.

The obfuscation can be configured to always apply, either for a particular type of data or for a particular client or type of client, or apply based on user, user's role, or workflow. By way of non-limiting example, if protective analytics engine 110 detects that the user has not followed a recognized workflow to get to a screen with sensitive data 153, then the sensitive data 153 is obscured. By way of further non-limiting example, only a user assigned to accounts payable may have access to client payment information. Other analytical standards may be used. By way of non-limiting examples, if the agent is accessing numerous accounts at a faster-than-normal rate or accessing accounts without a corresponding incoming client contact, further sensitive data 153 may be obscured. A user repeatedly looking up account information for large or high-value clients at a higher-than-normal frequency may find further sensitive data 153 obscured.

The desktop data fields 151 to obscure can be identified either automatically by matching on known sensitive data characteristics such as, but not limited to, physical and email addresses, social security numbers, bank account numbers, or credit card numbers, or can be manually identified and configured as a desktop analytics trigger. Sensitive data may have an associated sensitivity rating depending on the potential for damage due to unauthorized access. By way of non-limiting example, a phone number may have a low sensitivity rating, a residential address a medium rating, and a social security number a high rating. Recognized workflows can be manually defined or learned by system 100 through machine learning algorithms.

If the user attempts to stop or bypass the obfuscation process, safeguard method 250 immediately obscures the entire desktop momentarily while it restarts the obfuscation process. Such a method may be part of data obfuscation method 200 or a separate method. Such attempts to disable the obfuscation process may be logged by protective analytics engine 110 and transmitted to a supervisor or human resources team member.

The screen recorder 160 can record the entire session on desktop 150 for later viewing, so there is no need to lose some of the interaction with a "pause." The data obfuscation method 200 can be applied to any application, even legacy applications and systems, and can be applied selectively based on an agent's role or if the agent exhibits unusual behavior.

Figure 1A:
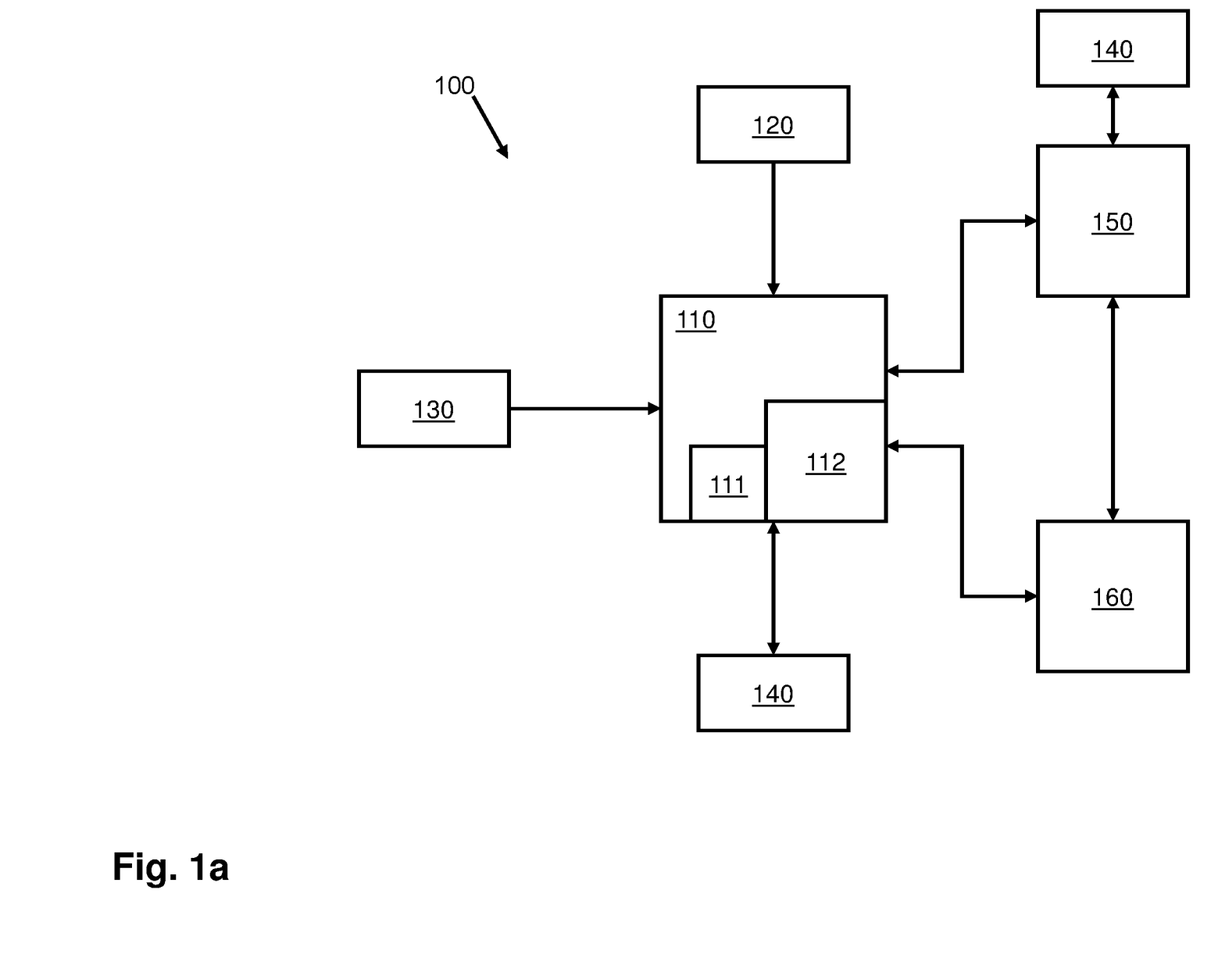
FIG. 1a illustrates a block diagram of an example embodiment of a protective system for automated on-screen sensitive data identification and obfuscation according to the present application.

FIG. 1a illustrates a block diagram of an example embodiment of the protective system 100 for automated on-screen sensitive data identification and obfuscation according to the present application. The protective system 100 includes a protective analytics engine 110 receiving input from at least one of a data input 120, a feedback input 130, an external system 140, and/or desktop 150. In various embodiments, protective system 100 may include multiple types of each input.

The protective analytics engine 110 is configured to constantly receive and analyze data within the protective system 100. The analysis may be a real-time analysis of streaming data or a batch analysis of data. The protective analytics engine 110 monitors user workflow on desktop 150, determines the level of obfuscation to apply to sensitive data 153 called up on desktop 150, and receives credentials from desktop 150 to remove data field blocks 152. The same process can apply to recorded sessions from screen recorder 160. The protective analytics engine 110 monitors recorded sessions on desktop 150 and/or screen recorder 160, determines the level of obfuscation to apply to sensitive data 153 in the recorded session, and receives credentials from desktop 150 and/or screen recorder 160 to remove data field blocks 152.

The protective analytics engine 110 includes at least one set of protective analytics rules 111 used to analyze data. The protective analytics rules 111 determine responses to information extracted from the received input, governing which desktop data fields 151 to obscure or show. The analytics rules 111 can also be used to calculate confidence levels for protective analytics engine 110 and to compare them to at least one given threshold. If the confidence levels drop below the given threshold, a user or third party may receive an alert notification and/or a request to make manual changes to analytics rules 111.

The protective analytics rules 111 may be static or they may be dynamically updated by protective analytics engine 110, data input 120, feedback input 130, and/or a user or third party utilizing the external system 140 or the desktop 150. Updates to the protective analytics rules 111 may be manual or automatic. Automatic updates to protective analytics rules 111 may be triggered by meeting certain criteria from protective analytics rules 111 of protective analytics engine 110 or the data input 120, feedback input 130, external system 140, and/or desktop 150. Automatic updates may also occur at predetermined intervals. Protective analytics rules 111 may be software programs or separate files executed by a software program. An optional protective analytics memory 112 may store protective analytics rules 111, the results of analyses, or any other data. If protective analytics engine 110 is used during agent training, protective analytics engine 110 may route training exercises to/from external system 140.

The desktop 150 receives and displays desktop data fields 151 and any input from external system 140, if applicable. Any desktop data field 151 may be obscured by at least one data field block 152 if the desktop data field 151 contains sensitive data 153. The data field block 152 may simply be an absence of characters or may have the appearance of a specific graphic to notify the user that sensitive data 153 is in desktop data field 151, but not presently accessible. The specific graphic may be certain graphical patterns, alphanumeric characters, or any combination thereof. The desktop 150 may also display credential prompts 154 as appropriate to ensure that a user enters the proper credentials to access sensitive data 153.

A screen recorder 160 allows recording of activities taking place on desktop 150. The screen recorder 160 can record the entire session of interaction between the user and desktop 150 while still protecting sensitive data 153. Since obscured sensitive data 153 can still be tagged to the screen recorder 160, data obfuscation is available during both playback and quality monitoring where the viewer is not authorized to view sensitive data 153.

Figure 1B:
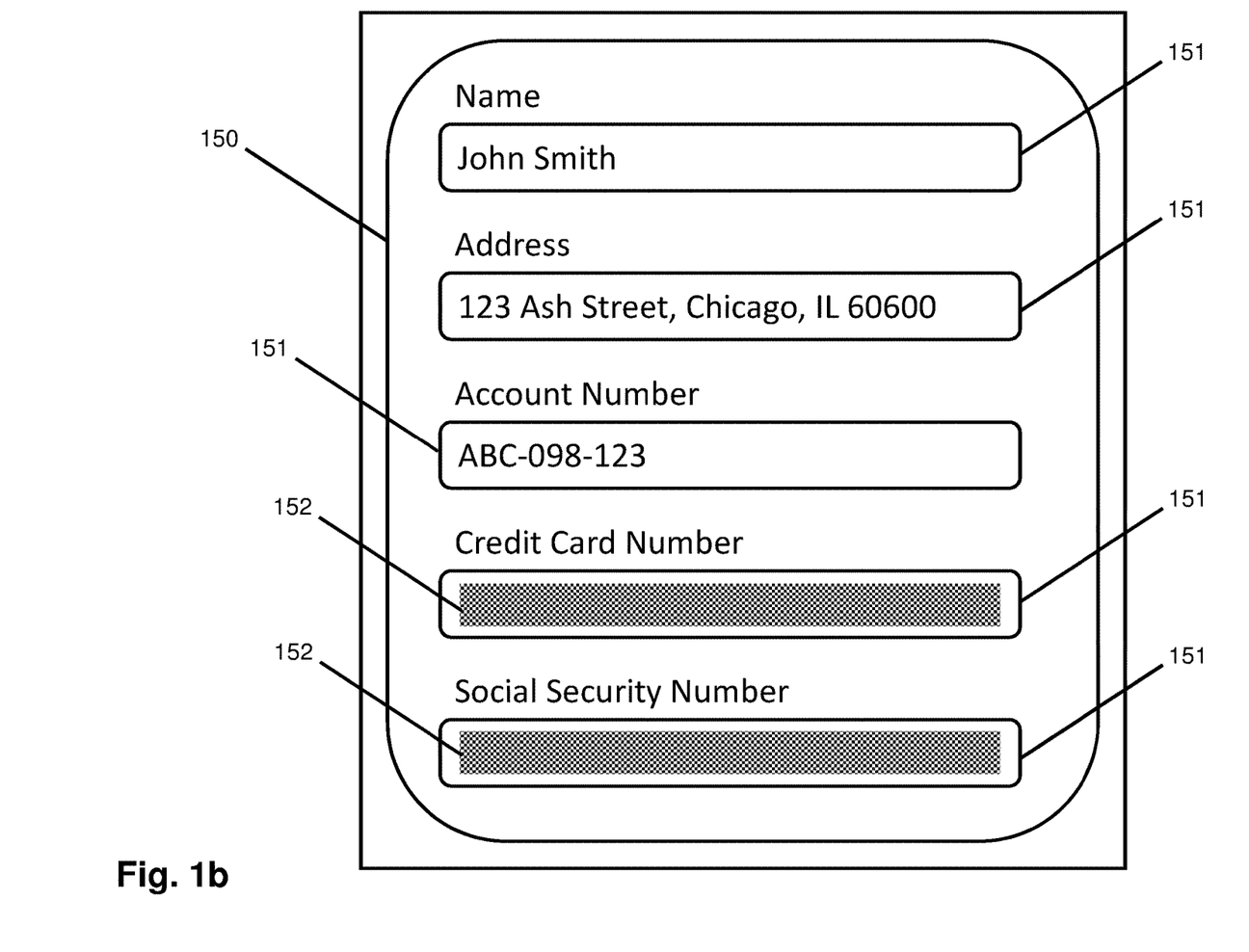
FIGS. 1b, 1c, and 1d illustrate a desktop using various embodiments of the above system.
Figure 1C:
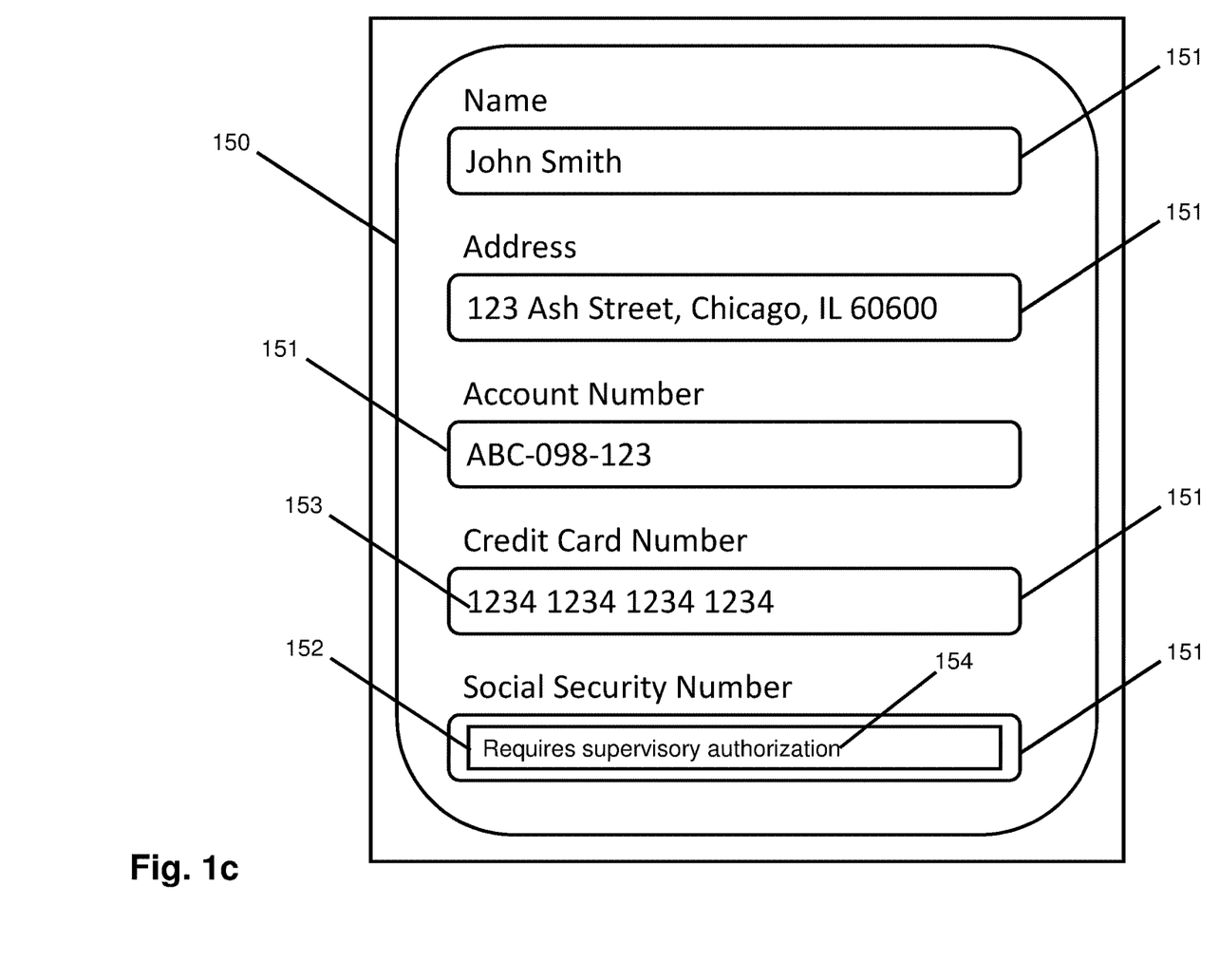
Figure 1D:
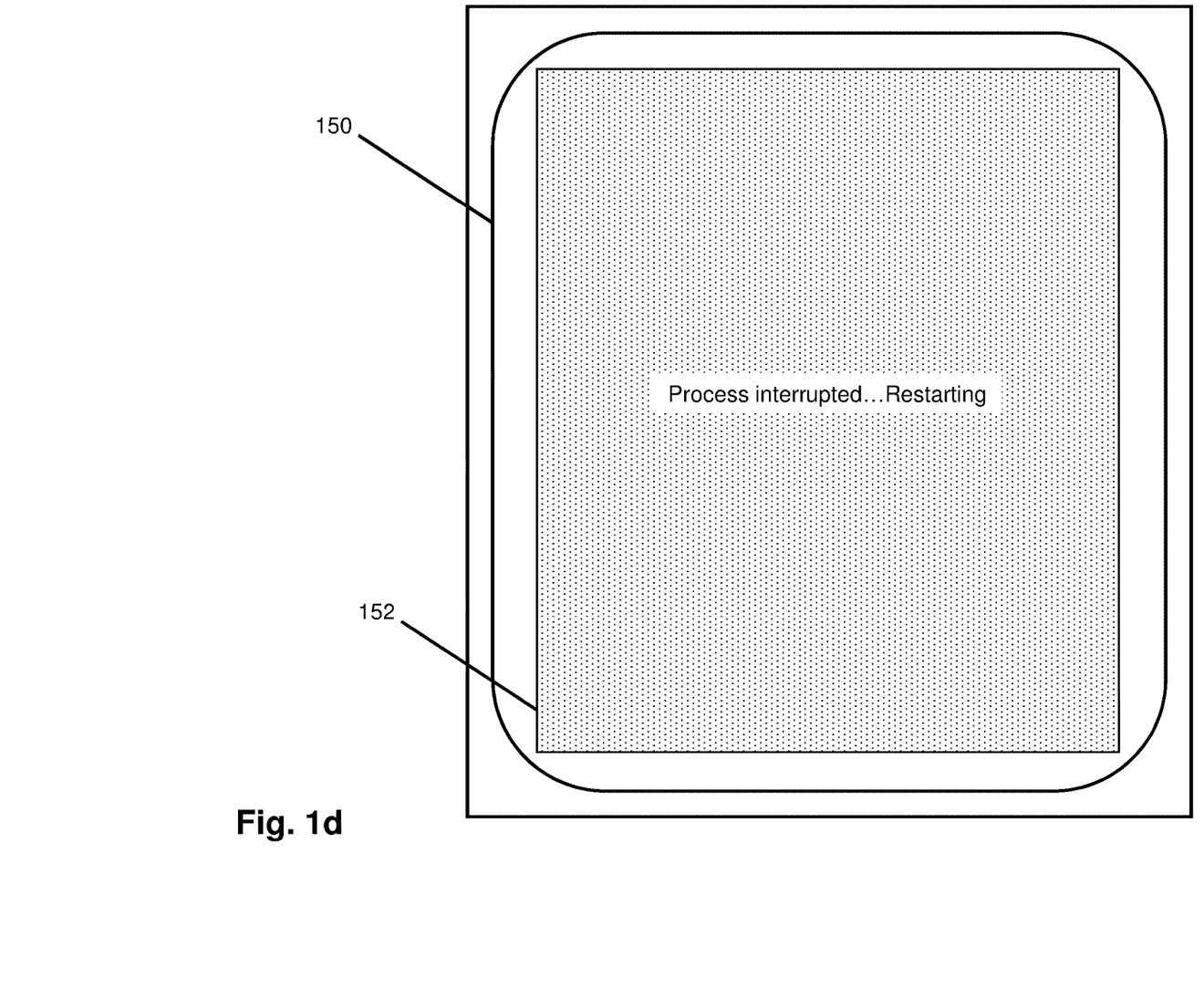

FIGS. 1b, 1c, and 1d illustrate desktop 150 at various stages of use, using various embodiments of the above system 100. In FIG. 1b, a standard desktop 150 displays various desktop data fields 151, with two desktop data fields 151 having data field blocks 152 obscuring sensitive data 153. In FIG. 1c, the data field block 152 obscuring one desktop data field 151 has been removed, allowing access to sensitive data 153. However, the second data field block 152 still requires supervisory authorization to access sensitive data 153, as specified by credential prompt 154. In the embodiment show in FIG. 1d, the agent has attempted to bypass data obfuscation method 200; as a result, protective analytics engine 110 has completely obscured desktop 150 with data field block 152 until protective analytics engine 110 has restarted data obfuscation method 200.

Figure 2A:
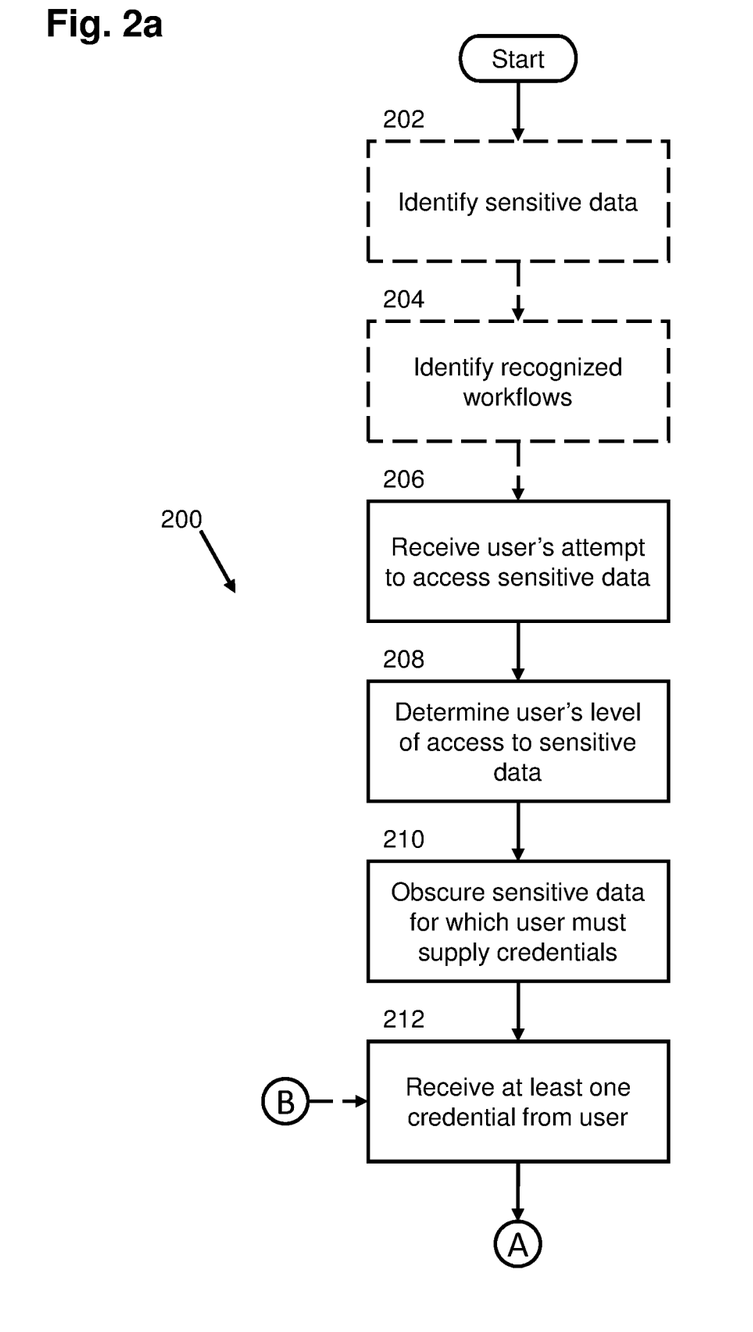
FIGS. 2a, 2b, and 2c illustrate a flow chart of an example embodiment of a method for automated on-screen sensitive data identification and obfuscation according to the present application.
Figure 2B:
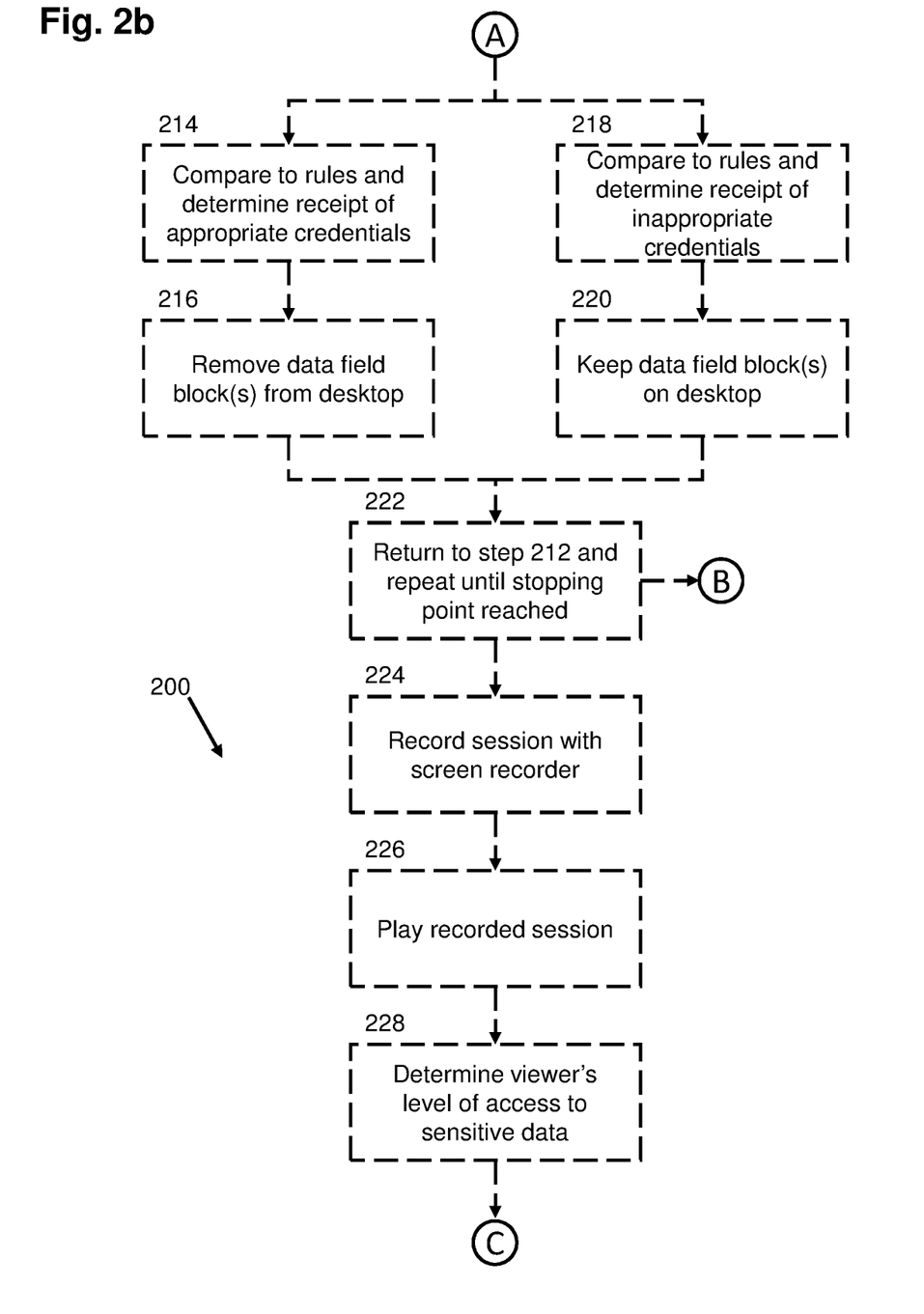
Figure 2C:
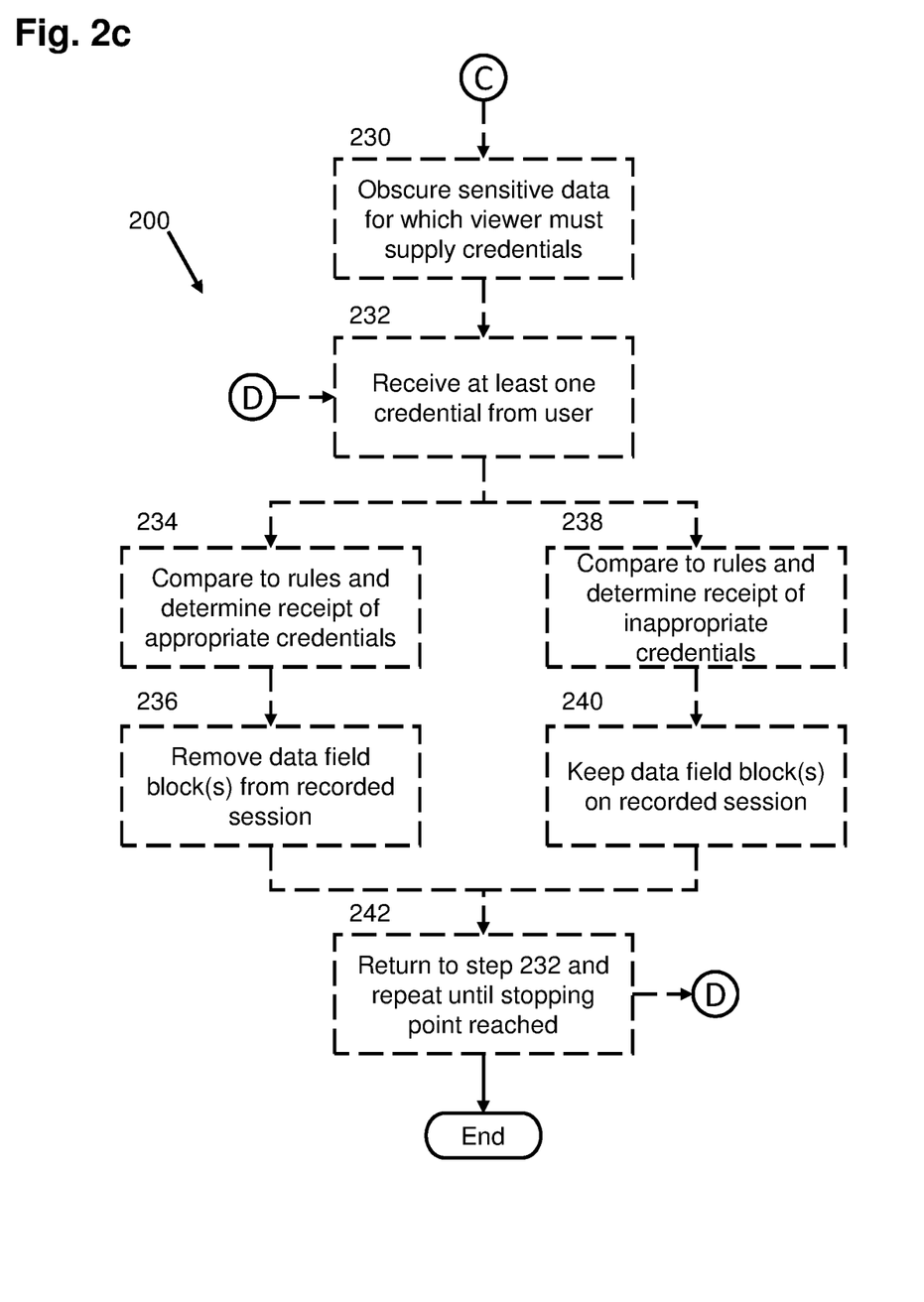

FIGS. 2a through 2c illustrate a flow chart of an example embodiment of a data obfuscation method 200 for automated on-screen sensitive data identification and obfuscation according to the present application.

As seen in FIG. 2a, in optional step 202, the system identifies sensitive data. The desktop data fields 151 to obscure can be identified either automatically by matching previously known sensitive data characteristics such as, but not limited to, physical and email addresses, social security numbers, bank account numbers, or credit card numbers, or can be manually identified. In certain embodiments, step 202 also assigns a level of sensitivity to the sensitive data.

In optional step 204, the system identifies recognized workflows.

Workflows can be manually defined or learned by the system through machine learning algorithms.

In step 206, the system receives a user's attempt to access previously-identified sensitive data in a session.

In step 208, the system determines the user's level of access to sensitive data. Level of access may be based on the user, the task, the user's current or previous actions, the type of data, the client, the client category, or any combination thereof.

In step 210, the system obscures any sensitive data for which the user must supply credentials by placing at least one data field block on the desktop over the sensitive data. This takes place before the sensitive data is displayed on the desktop. The timing and positioning of the placement of the at least one data field block is such that the sensitive data cannot in any way be seen by the user until later steps are completed.

In optional step 212, the system receives at least one credential from the user. Credentials may take the form of alphanumeric strings, actions by the user or other staff, or data files such as, but not limited to security certificates. By way of non-limiting example, such credentials may also include proper adherence to workflow or other processes, a user-specific password, required client information, or a supervisor-specific or another party-specific password. Optionally, this step may include a prompt or the user may simply supply credentials without prompting. Unprompted actions may include, but are not limited to, following proper workflow procedures or entering required client information.

As seen in FIG. 2b, in optional step 214, the system compares the received credential or credentials to at least one protective analytics rule and determines that it has received appropriate credentials from the user.

In optional step 216, the system removes at least one data field block from the desktop to allow viewing of the sensitive data. Multiple data field blocks may be removed if they require the same or overlapping credentials. By way of non-limiting example, if a user must complete workflow steps A, B, and C in order to access a first piece of sensitive data, upon completion of steps A through C the user will be also able to view a second piece of sensitive data which requires completion of steps B and C in any order, and a third piece of sensitive data which requires completion of step C.

In optional step 218, the system compares the received credential or credentials to at least one protective analytics rule and determines that it has received inappropriate credentials from the user.

In optional step 220, the system keeps the at least one data field block on the desktop, preventing viewing of the sensitive data.

In optional step 222, the system returns to step 212 to repeat steps 212 through 220, as applicable, until the method reaches a stopping point. The stopping point may be an action or a condition, such as, but not limited to, when the user stops trying to access the sensitive data, no data field blocks remain, or no data field blocks remain for which the user can supply credentials. In certain embodiments, the stopping point may occur after a given period of time and/or a particular number of iterations in which the user enters inappropriate credentials. The period of time and/or number of iterations may be predefined and/or may be dependent on at least one of the identity of the user, the task, the user's current or previous actions, the client, the client category, the type or level of sensitivity of the sensitive data, or any combination thereof.

In optional step 224, the system records the session with a screen recorder.

In optional step 226, the system plays the recorded session for a viewer.

In optional step 228, the system determines the viewer's level of access to the sensitive data.

As seen in FIG. 2c, in optional step 230, the system obscures any sensitive data for which the viewer must supply credentials by placing at least one data field block over the sensitive data before the recorded session is displayed.

In optional step 232, the system prompts the viewer to submit at least one credential to view the sensitive data. Credentials may take the forms detailed above in step 212.

In optional step 234, the system compares the received credential or credentials to at least one protective analytics rule and determines that it has received appropriate credentials from the viewer.

In optional step 236, the system allows viewing of the sensitive data by removing at least one data field block from the recorded session.

In optional step 238, the system compares the received credential or credentials to at least one protective analytics rule and determines that it has received inappropriate credentials from the viewer.

In optional step 240, the system keeps the data field block on the recorded session, preventing viewing of the sensitive data.

In optional step 242, the system returns to step 232 to repeat steps 232 through 240, as applicable, until the method reaches a stopping point. The stopping point may be an action or a condition, such as, but not limited to, when the recorded session ends, the viewer stops trying to access the sensitive data, no data field blocks remain, or no data field blocks remain for which the user can supply credentials. In certain embodiments, the stopping point may occur after a given period of time and/or a particular number of iterations in which the user enters inappropriate credentials. The period of time and/or number of iterations may be predefined and/or may be dependent on at least one of the identity of the viewer, the task, the viewer's current or previous actions, the client, the client category, the type or level of sensitivity of the sensitive data, or any combination thereof.

Figure 2D:
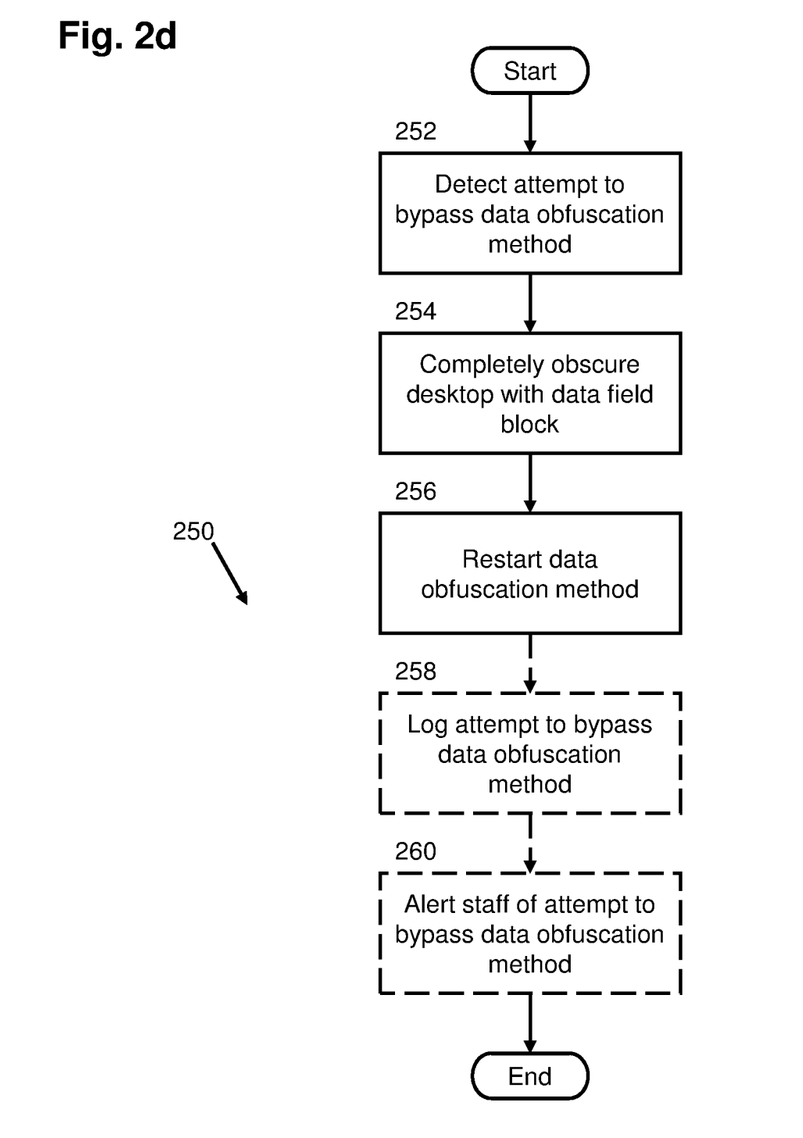
FIG. 2d illustrates a flow chart of an example embodiment of a safeguard method for protecting sensitive data during performance of the data obfuscation method

FIG. 2d illustrates a flow chart of an example embodiment of a safeguard method 250 for protecting sensitive data during performance of data obfuscation method 200.

In step 252, the system detects the user's attempt to bypass the data obfuscation method 200.

In step 254, the system completely obscures the user's desktop with a data field block.

In step 256, the system's protective analytics engine restarts the data obfuscation method 200.

In optional step 258, the system logs the user's attempt to bypass the data obfuscation method 200.

In optional step 260, the system transmits an alert to supervisory, HR, or other staff detailing the user's attempt to bypass the data obfuscation method 200. Such details may include identification of the user, the time of the attempt, the sensitive data that the user was attempting to access, and/or any other information related to either the user or the sensitive data.

The safeguard method 250 may be performed at any point during execution of the data obfuscation method 200.

Figure 3:
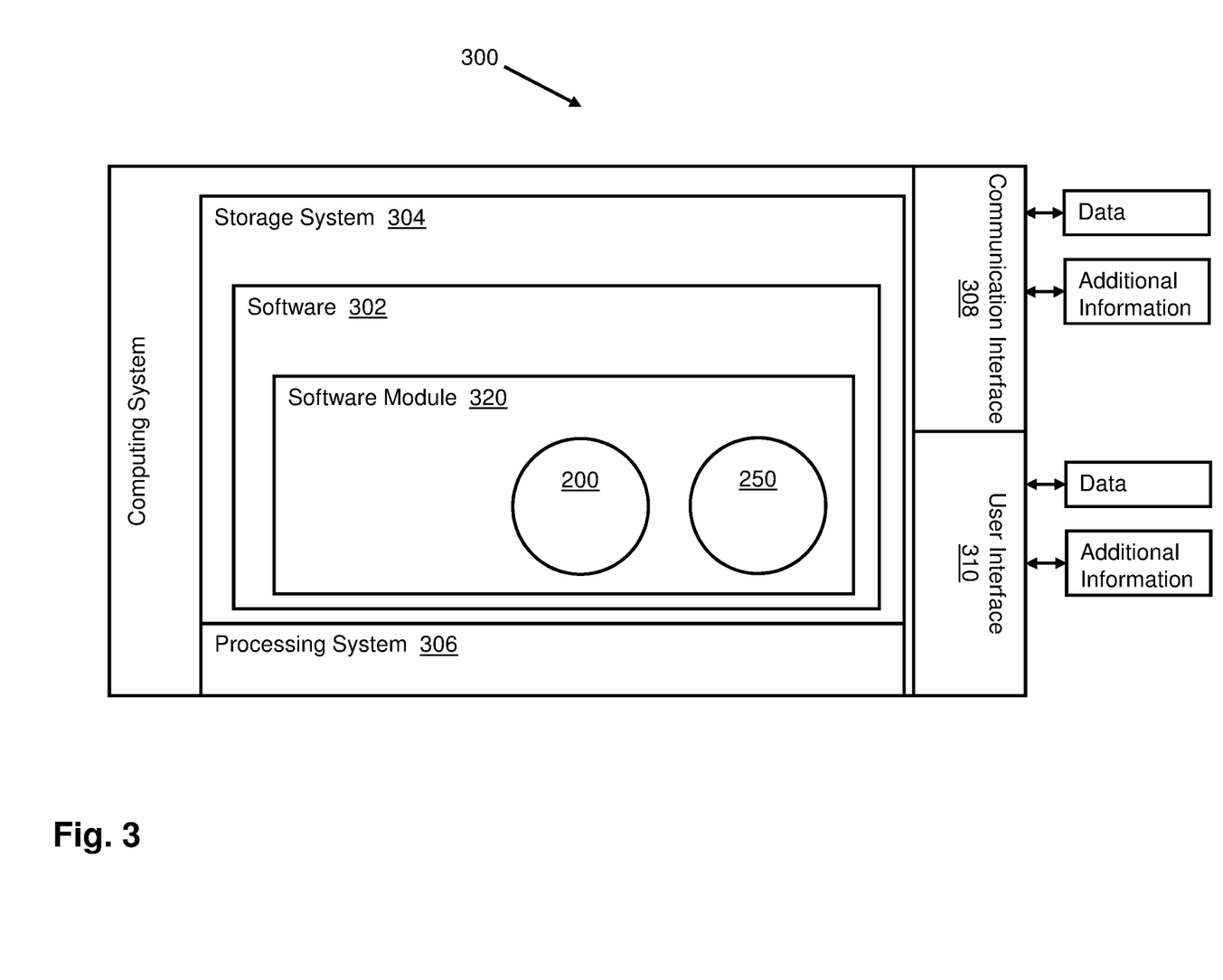
FIG. 3 illustrates an example embodiment of a system for automated on-screen sensitive data identification and obfuscation according to the present application.

FIG. 3 depicts an example embodiment of system 300 for automated on-screen sensitive data identification and obfuscation according to the present application. The computing system 300 may be used to implement embodiments of portions of the protective system 100, and/or in carrying out embodiments of the data obfuscation method 200 and/or the safeguard method 250.

The system 300 is generally a computing system that includes a processing system 306, a storage system 304, software 302, a communication interface 308, and a user interface 310. The processing system 306 loads and executes software 302 from the storage system 304, including a software module 320. When executed by computing system 300, software module 320 directs the processing system 306 to operate as described in herein in further detail in accordance with the above data obfuscation method 200 and safeguard method 250.

The computing system 300 includes a software module 320 for performing data obfuscation method 200. Although computing system 300 as depicted in FIG. 3 includes one software module 320 in the present example, it should be understood that more modules could provide the same operation. Similarly, while the description as provided herein refers to a computing system 300 and a processing system 306, it is to be recognized that implementations of such systems can be performed using one or more processors, which may be communicatively connected, and such implementations are considered to be within the scope of the description. It is also contemplated that these components of computing system 300 may be operating in a number of physical locations.

The processing system 306 can comprise a microprocessor and other circuitry that retrieves and executes software 302 from storage system 304. The processing system 306 can be implemented within a single processing device but can also be distributed across multiple processing devices or sub-systems that cooperate in existing program instructions. Non-limiting examples of processing systems 306 include general purpose central processing units, application specific processors, and logic devices, as well as any other type of processing device, combinations of processing devices, or variations thereof.

The storage system 304 can comprise any storage media readable by processing system 306, and capable of storing software 302. The storage system 304 can include volatile and non-volatile, removable and non-removable media implemented in any method or technology for storage of information, such as, but not limited to, computer readable instructions, data structures, program modules, or other information. The storage system 304 can be implemented as a single storage device but may also be implemented across multiple storage devices or sub-systems. The storage system 304 can further include additional elements, such a controller capable of communicating with the processing system 306.

Non-limiting examples of storage media include random access memory, read only memory, magnetic discs, optical discs, flash memory, virtual memory, and non-virtual memory, magnetic sets, magnetic tape, magnetic disc storage or other magnetic storage devices, or any other medium which can be used to store the desired information and that may be accessed by an instruction execution system, as well as any combination or variation thereof, or any other type of storage medium. In some implementations, the storage media can be a non-transitory storage media. In some implementations, at least a portion of the storage media may be transitory. Storage media may be internal or external to system 300.

As described in further detail herein, computing system 300 receives and transmits data through communication interface 308. The data can include entered credentials, workflows, workflow standards, sensitive data characteristics, triggers, algorithm data, access logs, disabling logs, screen recordings, system and/or application characteristics, and/or any other data that may pertain to data obfuscation method 200. In embodiments, the communication interface 308 also operates to send and/or receive information, such as, but not limited to, additional information to/from other systems to which computing system 300 is communicatively connected, input related to workflows, access, and/or triggers, and/or any other information that may pertain to data obfuscation method 200.

The user interface 310 can include one or more of a mouse, a keyboard, a voice input device, a touch input device for receiving a gesture from a user, a motion input device for detecting non-touch gestures and other motions by a user, and/or other comparable input devices and associated processing elements capable of receiving user input from a user. The user interface 310 can include one or more output devices such as, but not limited to, a video display or graphical display which can display the desktop and/or a recorded session, or another interface further associated with embodiments of the system and method as disclosed herein. Speakers, printers, haptic devices and other types of output devices may also be included in the user interface 310. Users, supervisors, or other staff can communicate with computing system 300 through the user interface 310 in order to view any data or information, enter, modify, or receive any other data or information, or any number of other tasks the users, supervisors, or other staff may want to complete with computing system 300.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. A method for automated on-screen sensitive data identification and obfuscation, comprising:
    monitoring, by a protective analytics engine, a user workflow for a user on a desktop, wherein the monitoring the user workflow includes tracking how the user gets to a screen with sensitive data;
    receiving, from the user, a user request to display desktop data fields on the desktop in a session, one or more desktop data fields including an attempt to access sensitive data in the session on the desktop;
    in response to the user request received, determining a user access level for sensitive data for the user;
    identifying sensitive data that the user is not allowed to access in the desktop data fields based on the user access level for sensitive data for the user;
    comparing the user workflow being monitored to a set of recognized workflows, when the user workflow being monitored is not within the set of recognized workflows, identify additional sensitive data that the user is not allowed to access in the desktop data fields;
    obscuring, at a desktop data field level, any sensitive data identified as the sensitive data that the user is not allowed to access based on the user access level for sensitive data and any additional sensitive data identified as the additional sensitive data that the user is not allowed to access based on the user workflow, wherein, the obscuring includes placing a data field block over a desktop data field with the sensitive data and a data field block over a desktop data field with the additional sensitive data, the sensitive data and the additional sensitive data requiring additional credential on the desktop before the sensitive data and the additional sensitive data is displayed on the desktop such that the sensitive data and the additional sensitive data cannot be seen by the user; and receiving a credential from the user and comparing the credential to at least one protective analytics rule;

upon a match is found between the credential received and the at least one protective analytics rule, removing the data field block over the desktop data field with the sensitive data and the data field block over the desktop data field with the additional sensitive data to grant the user access to the sensitive data that the user is not allowed to access and the additional sensitive data.

2. The method of claim 1, further comprising prompting the user to submit a credential to view the sensitive data that the user is not allowed to access based on the user access level and the additional sensitive data that is obscured.

3. The method of claim 1, further comprising keeping the data field block over the desktop data field with the sensitive data and the data field block over the desktop data field with the additional sensitive data requiring the additional credential after receiving an inappropriate credential from the user.

4. The method of claim 1, wherein the sensitive data that the user is not allowed to access and the additional sensitive data is identified manually or by automatic matching to previously known sensitive data characteristics.

5. The method of claim 4, further comprising assigning a level of sensitivity to the sensitive data that the user is not allowed to access and the additional sensitive data.

6. The method of claim 1, further comprising identifying the set of recognized workflows by manual definition or by using machine learning algorithms.

7. The method of claim 1, further comprising:
recording the session with a screen recorder;
playing the recording of the session on the desktop for a viewer;
determining a viewer access level for sensitive data for the viewer;
obscuring, at the desktop data field level, any sensitive data that the viewer is not allowed to access based on the viewer access level for sensitive data, the obscuring including a data field block over the desktop data field with the sensitive data requiring the additional credential on the desktop before the sensitive data requiring the additional credential is displayed on the desktop; and
receiving a credential from the viewer and comparing the credential from the viewer to at least one protective analytics rule.

8. The method of claim 7, further comprising removing the data field block over the desktop data field with the sensitive data requiring the additional credential after receiving an appropriate credential from the viewer.

9. The method of claim 7, further comprising keeping the data field block over the desktop data field with the sensitive data requiring the additional credential after receiving an inappropriate credential from the viewer.

10. The method of claim 1, further comprising:
detecting an attempt by the user to bypass the method for automated on-screen sensitive data identification and obfuscation;
completely obscuring the desktop with a data field block; and
restarting the method for automated on-screen sensitive data identification and obfuscation.

11. The method of claim 10, further comprising logging an attempt by the user to bypass the method for automated on-screen sensitive data identification and obfuscation.

12. The method of claim 10, further comprising transmitting an alert to staff that the user attempted to bypass the method for automated on-screen sensitive data identification and obfuscation.

13. The method of claim 1, further comprising repeating the receiving a credential from the user until reaching a stopping point.

14. The method of claim 13, wherein the stopping point is an action or a condition selected from a group consisting of: the user stops trying to access sensitive data, no data field blocks remain, no data field blocks remain for which the user can supply a credential, a given period of time has passed, the user enters inappropriate credentials for a given number of iterations, and any combination thereof.

15. The method of claim 14, wherein at least one of the given period of time has passed or the given number of iterations are based on at least one of an identity of the user, a task, a current action of the user, a previous action of the user, a client, a client category, a type or level of sensitivity of the sensitive data, or any combination thereof.

16. A system for automated on-screen sensitive data identification and obfuscation, comprising:
a processor; and
a non-transitory computer readable medium comprising computer readable code that upon execution by the processor causes the system to:
monitor, by a protective analytics engine, a user workflow for a user on a desktop, wherein monitoring the user workflow includes tracking how the user gets to a screen with sensitive data;
receive, from the user, a user request to display desktop data fields on the desktop in a session, one or more desktop data fields including an attempt to access sensitive data in the session on the desktop;
determine a user access level for sensitive data for the user;
identify sensitive data that the user is not allowed to access in the desktop data fields based on the user access level for sensitive data for the user;
compare the user workflow being monitored to a set of recognized workflows, when the user workflow being monitored is not within the set of recognized workflows, identify additional sensitive data that the user is not allowed to access in the desktop data fields;
obscure, at a desktop data field level, any sensitive data identified as the sensitive data the user is not allowed to access based on the user access level for sensitive data and any additional sensitive data identified as the additional sensitive data the user is not allowed to access based on the user workflow, wherein, obscuring includes placing a data field block over a desktop data field with the sensitive data and a data field block over a desktop data field with the additional sensitive data, the sensitive data and the additional sensitive data, requiring additional credential on the desktop before the sensitive data and the additional sensitive data is displayed on the desktop such that the sensitive data or the additional sensitive data requiring the additional credential cannot be seen by the user; and
receiving a credential from the user and comparing the credential to at least one protective analytics rule;
upon a match is found between the credential received and the at least one protective analytics rule, remove the data field block over the desktop data field with the sensitive data and the data field block over the desktop data field with the additional sensitive data to grant the user access to the sensitive data that the user is not allowed to access and the additional sensitive data.

17. The system of claim 16, further comprising a user interface displaying the desktop.

18. The system of claim 17, further comprising a screen recorder operatively connected to the user interface to record the desktop during the session.

19. A non-transitory computer readable medium programmed with computer readable code that upon execution by a processor of a processing system causes the processing system to execute a method for automated on-screen sensitive data identification and obfuscation, comprising:

monitor, by a protective analytics engine, a user workflow for a user on a desktop, wherein monitoring the user workflow includes tracking how the user gets to a screen with sensitive data;

receive, from the user, a user request to display desktop data fields on the desktop in a session, one or more desktop data fields including an attempt to access sensitive data in the session on the desktop;

determine a user access level for sensitive data for the user;

identify sensitive data that the user is not allowed to access in the desktop data fields based on the user access level for sensitive data for the user;

compare the user workflow being monitored to a set of recognized workflows, when the user workflow being monitored is not within the set of recognized workflows, identify additional sensitive data that the user is not allowed to access in the desktop data fields;

obscure, at a desktop data field level, any sensitive data identified as the sensitive data the user is not allowed to access based on the user access level for sensitive data and any additional sensitive data identified as the additional sensitive data the user is not allowed to access based on the user workflow, wherein, obscuring includes placing a data field block over a desktop data field with the sensitive data and a data field block over a desktop data field with the additional sensitive data, the sensitive data or the additional sensitive data requiring additional credential on the desktop before the sensitive data and the additional sensitive data is displayed on the desktop such that the sensitive data and the additional sensitive data requiring the additional credential cannot be seen by the user; and receiving a credential from the user and comparing the credential to at least one protective analytics rule;

upon a match is found between the credential received and the at least one protective analytics rule, remove the data field block over the desktop data field with the sensitive data and the data field block over the desktop data field with the additional sensitive data to grant the user access to the sensitive data that the user is not allowed to access and the additional sensitive data.

* * * * *